Feb. 8, 1955  G. L. OTTO  2,701,482
MILLING AND CENTER-DRILLING MACHINE
Filed March 4, 1950  6 Sheets-Sheet 1
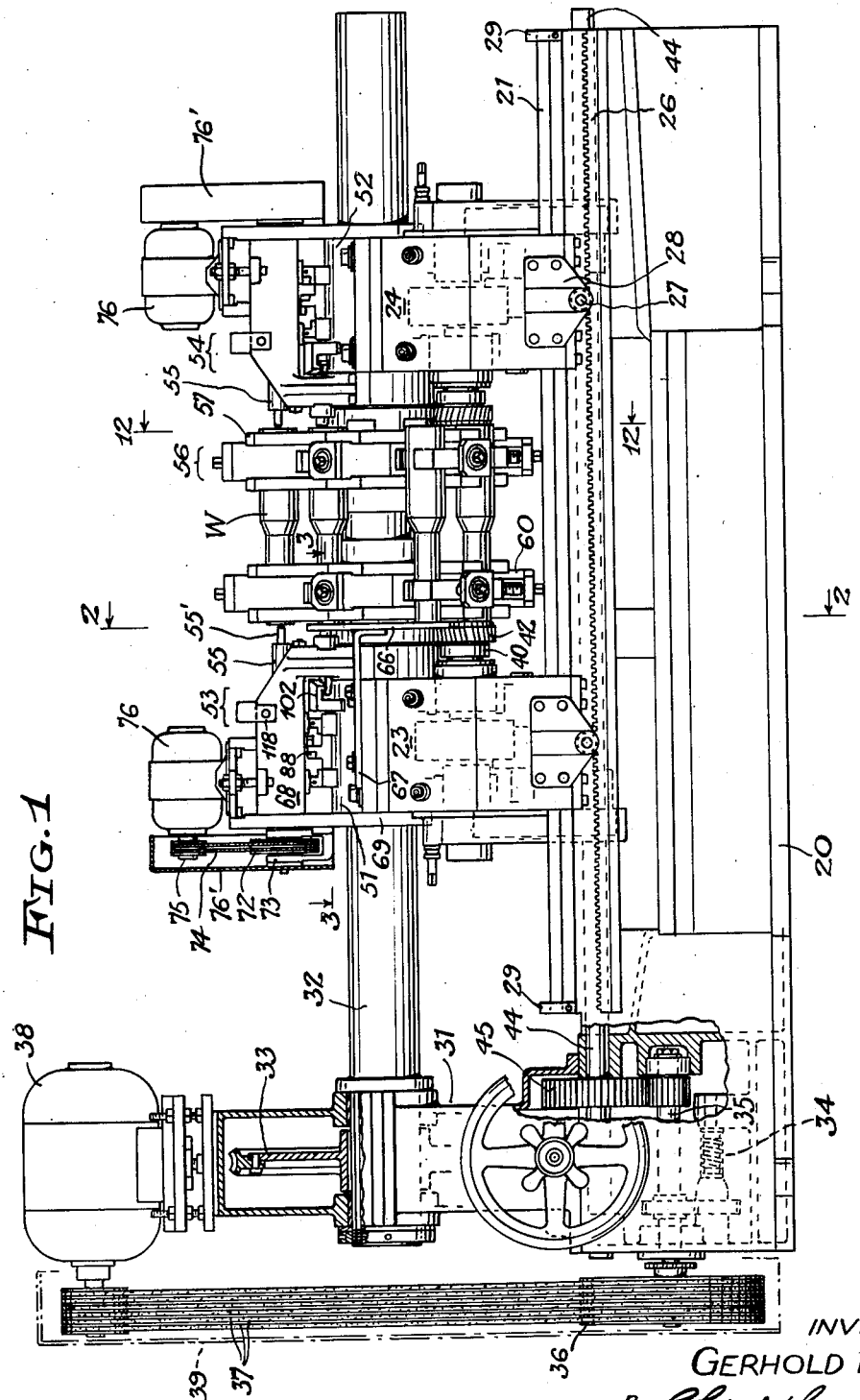
INVENTOR
GERHOLD L. OTTO
BY Christopher L. Waal
ATTORNEY

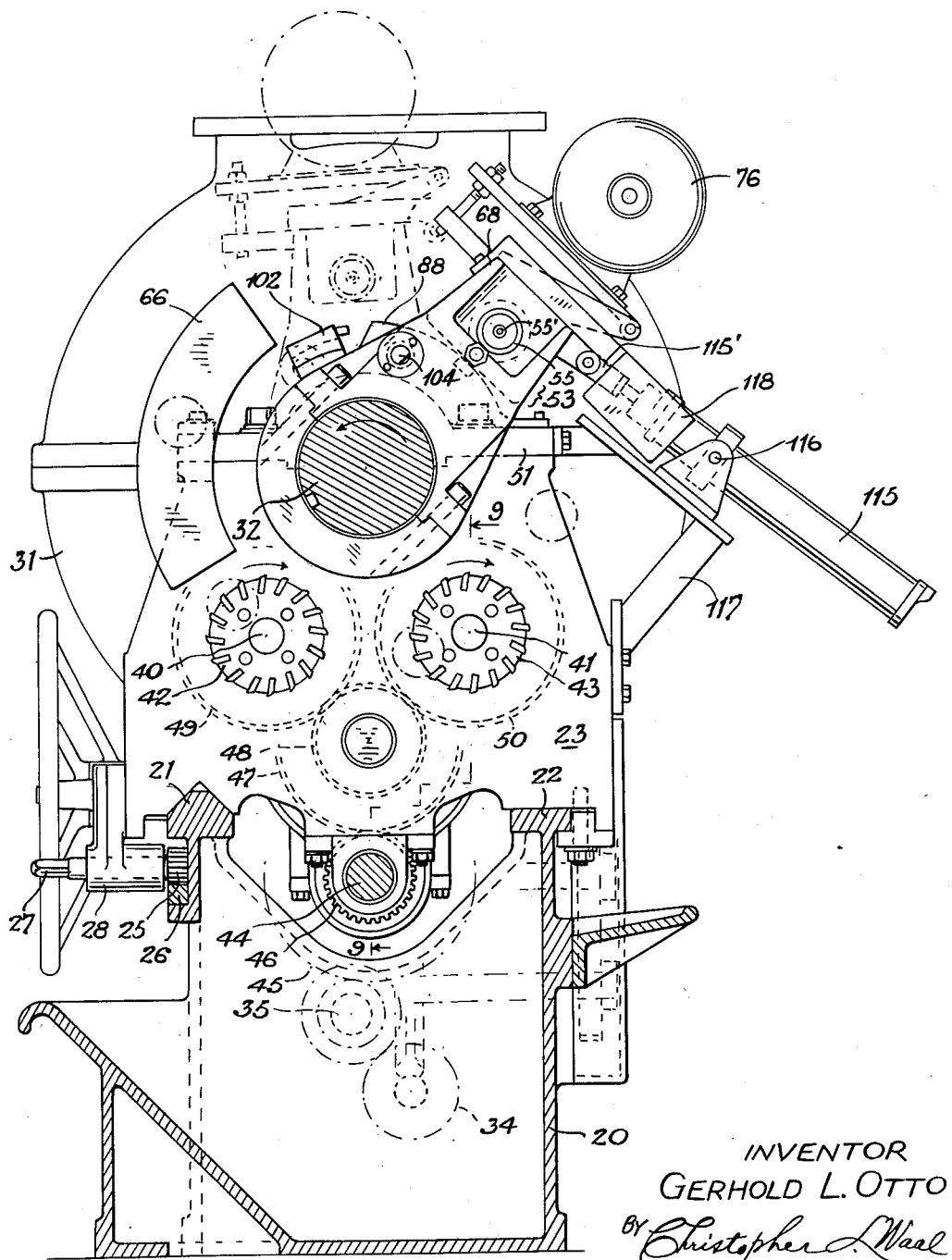

Feb. 8, 1955  G. L. OTTO  2,701,482
MILLING AND CENTER-DRILLING MACHINE
Filed March 4, 1950  6 Sheets-Sheet 3
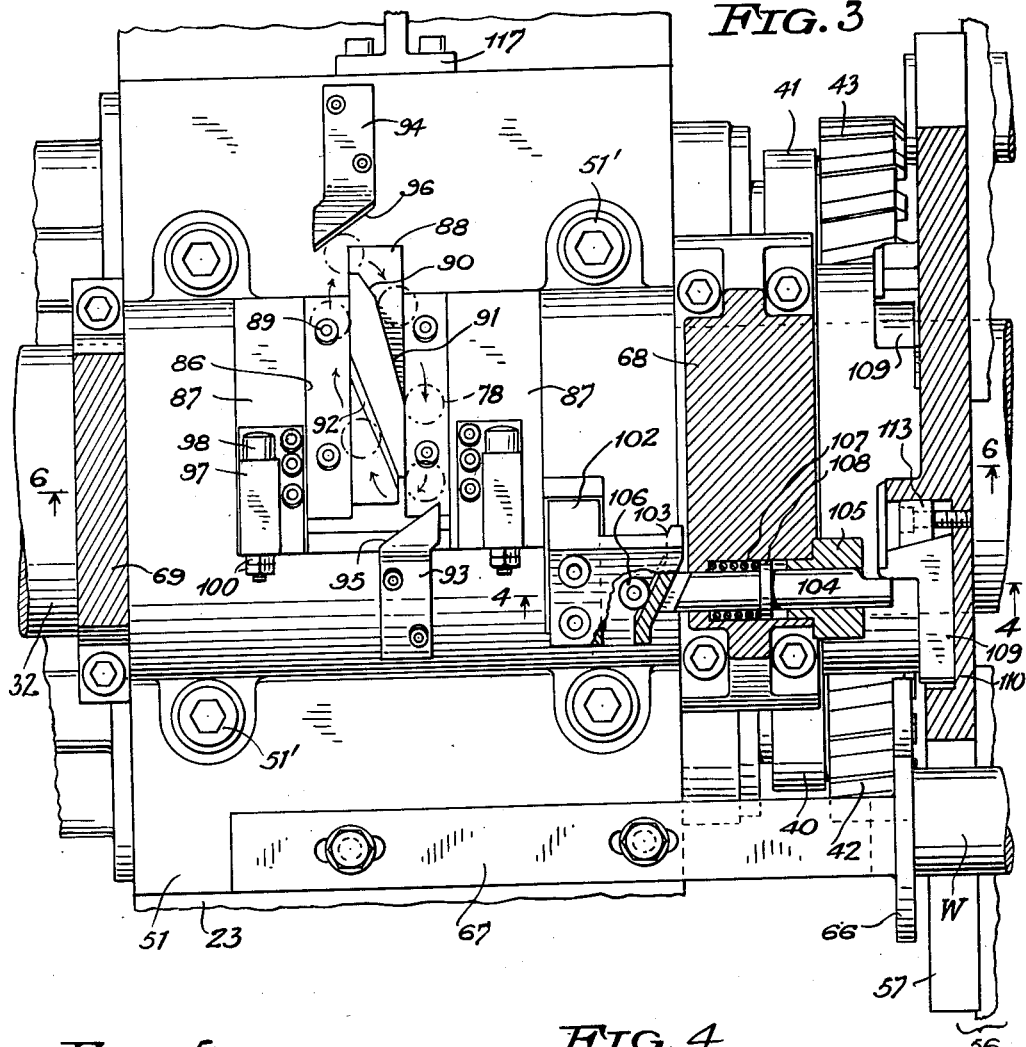
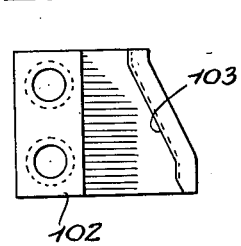
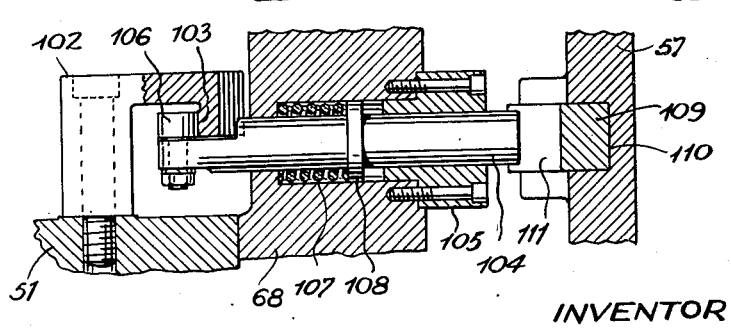
INVENTOR
GERHOLD L. OTTO
BY Christopher L. Waal
ATTORNEY Feb. 8, 1955    G. L. OTTO    2,701,482
MILLING AND CENTER-DRILLING MACHINE
Filed March 4, 1950    6 Sheets-Sheet 4
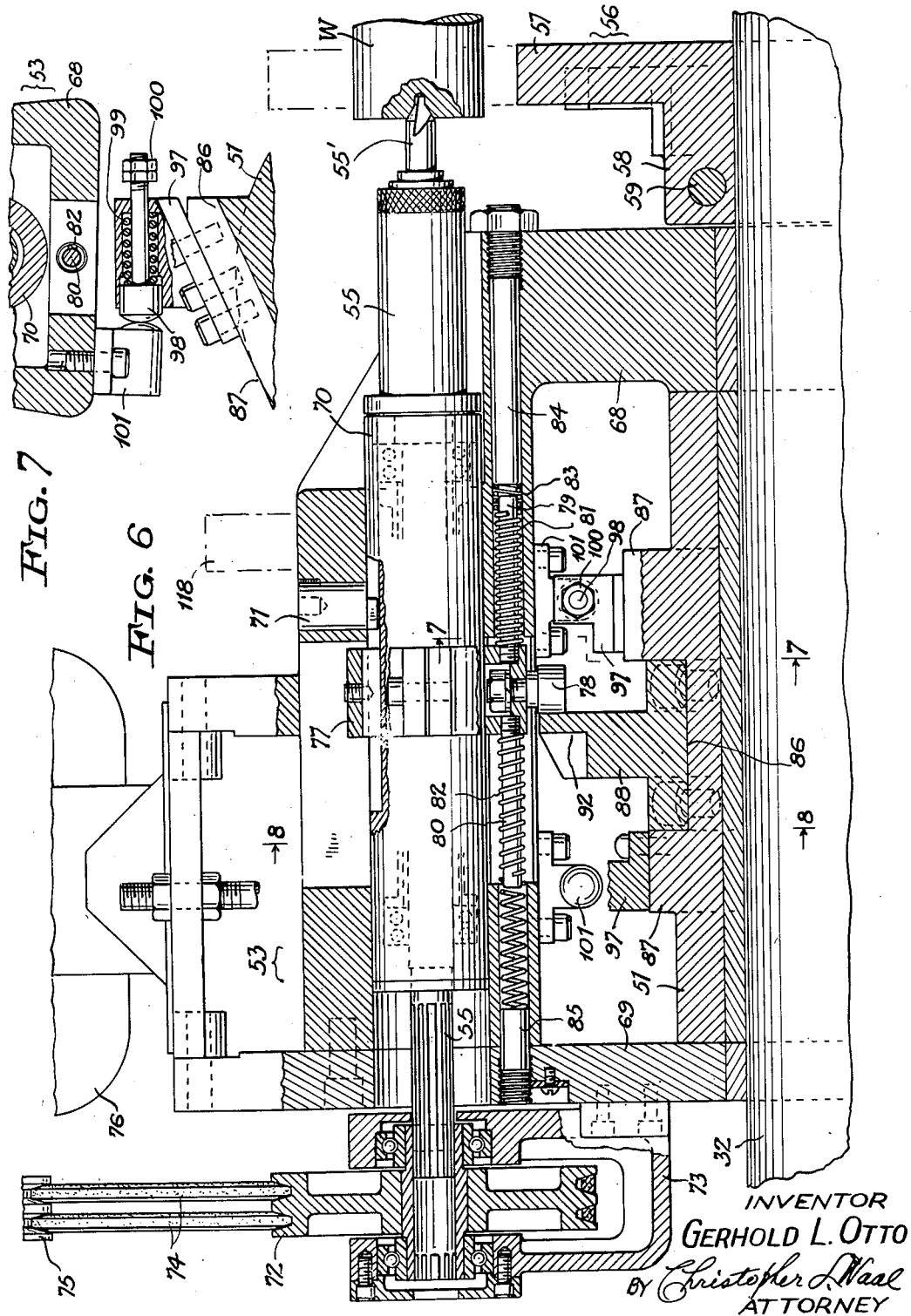
INVENTOR
GERHOLD L. OTTO
BY Christopher L. Naal
ATTORNEY Feb. 8, 1955 G. L. OTTO 2,701,482
MILLING AND CENTER-DRILLING MACHINE
Filed March 4, 1950 6 Sheets-Sheet 5
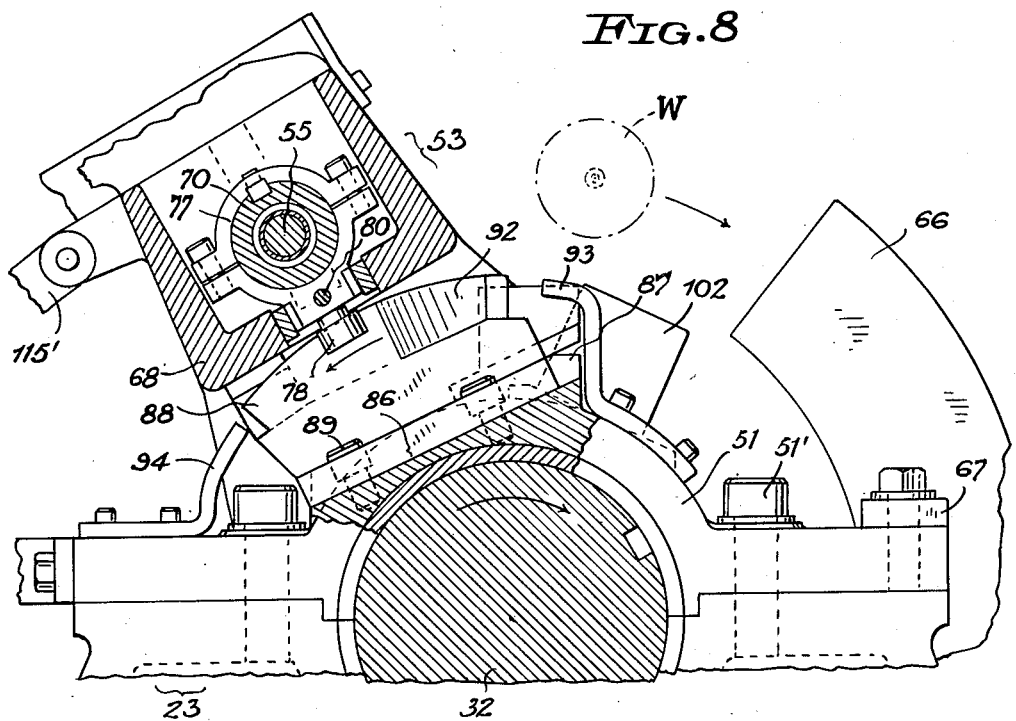
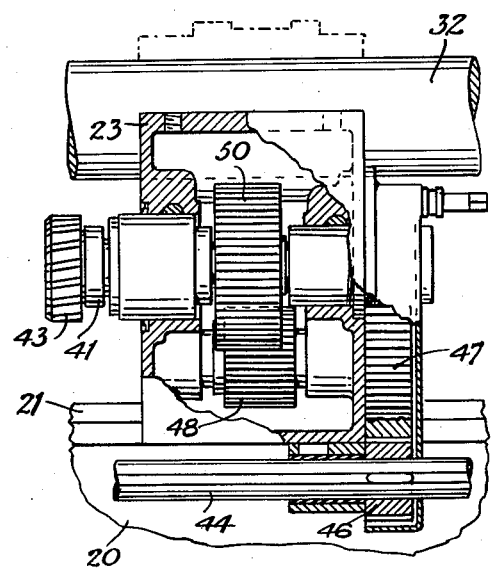
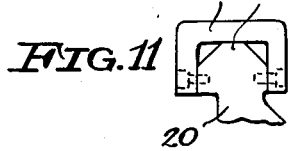
INVENTOR
GERHOLD L. OTTO
BY Christopher L. Waal
ATTORNEY

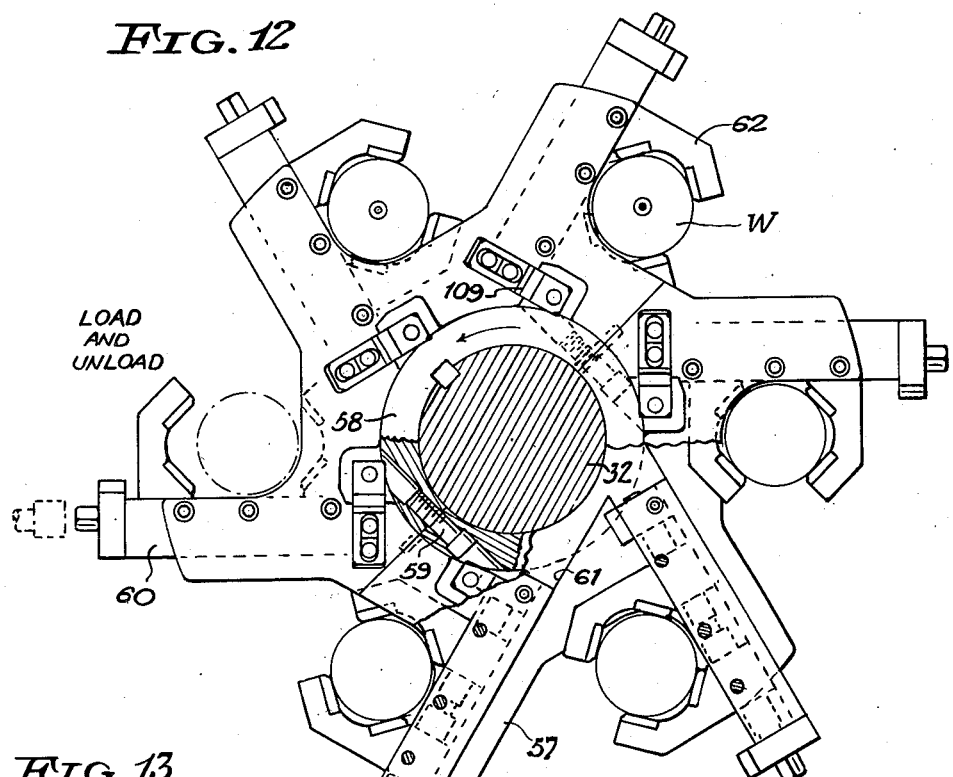
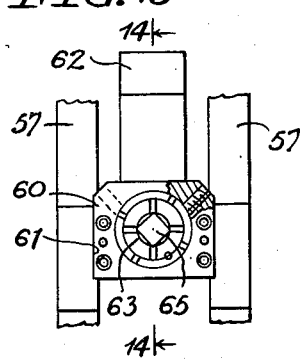
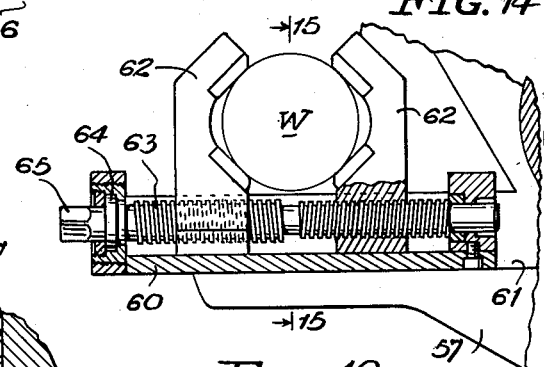
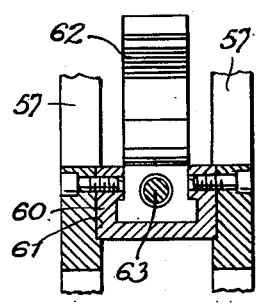
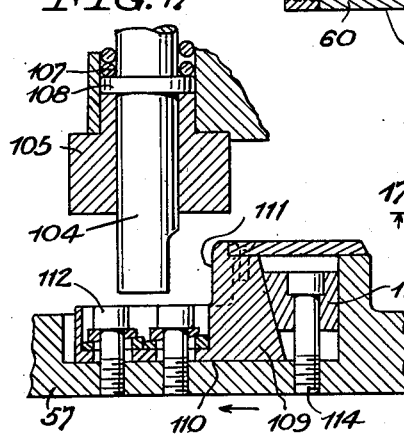
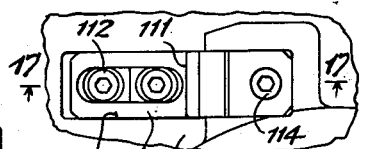

United States Patent Office 2,701,482
Patented Feb. 8, 1955

2,701,482

MILLING AND CENTER-DRILLING MACHINE

Gerhold L. Otto, Menomonee Falls, Wis., assignor to Davis & Thompson Company, West Allis, Wis., a corporation of Delaware Application March 4, 1950, Serial No. 147,583

9 Claims. (Cl. 77—18)

The present invention relates to machine tools, and more particularly to machines adapted for drilling centering holes in work pieces, and also to combined machines for milling and drilling the work pieces.

An object of the invention is to provide an improved machine tool including an oscillatory or shuttling drilling device which operates on successive continuously traveling work pieces.

Another object is to provide a machine tool in which the work pieces travel continuously in a curved orbit, and the drilling device is oscillatably mounted to follow the successive work pieces.

Still another object is to provide an improved machine tool adapted for both milling and drilling the work pieces.

A further object is to provide a center-drilling attachment which can be readily applied to a milling machine of the continuous rotary type.

A further object is to provide a machine tool having improved gaging means for facilitating adjustment of the machine on work pieces of different length.

A still further object is to perfect details of construction generally.

The invention consists in the several features hereinafter described and claimed.

In the accompanying drawings, Fig. 1 is a front elevation of a combined milling and center-drilling machine constructed in accordance with the invention, parts being broken away and parts being shown in section;

Fig. 2 is a transverse sectional elevation of the machine taken generally on the line 2—2 of Fig. 1, a drilling carriage being shown in retracted position in full lines and in advanced position in dotted lines;

Fig. 3 is a sectional view taken generally along the line 3—3 of Fig. 1;

Fig. 4 is a detail sectional view taken generally along the line 4—4 of Fig. 3;

Fig. 5 is a detail bottom view of a cam member;

Fig. 6 is a sectional view taken generally along the line 6—6 of Fig. 3;

Fig. 7 is a detail sectional view taken generally along the line 7—7 of Fig. 6, the drilling carriage being in its advanced position;

Fig. 8 is a transverse sectional view taken generally along the line 8—8 of Fig. 6 and showing a drilling carriage on its retracting stroke;

Fig. 9 is a detail sectional view taken generally along the line 9—9 of Fig. 2;

Fig. 10 is a detail view of a gaging member applied to the machine;

Fig. 11 is a detail end view of a gage abutment mounted on the frame of the machine;

Fig. 12 is a transverse sectional view taken generally on the line 12—12 of Fig. 1, showing a work-holding fixture;

Fig. 13 is an end view of one of the fixture arms, parts being broken away and parts being shown in section;

Fig. 14 is a detail sectional view taken generally along the line 14—14 of Fig. 13;

Fig. 15 is a detail sectional view taken generally along the line 15—15 of Fig. 14;

Fig. 16 is a detail view showing a fixture-mounted driver for the drilling carriage, and Fig. 17 is a detail sectional view taken generally along the line 17—17 of Fig. 16, showing the driver approaching an abutment member on the drilling carriage.

In the drawings, 20 designates an elongated base frame having parallel front and rear ways 21 and 22 extending horizontally along its upper edges. A pair of normally stationary housings 23 and 24 are slidably mounted on the ways, and each is adjustable therealong by a pinion 25 meshing with a horizontal rack 26 extending along the front of the base member, the pinion being carried on a manually rotatable shaft 27 which is journalled in a bracket 28 secured to the housing. Upstanding gage blocks 29 are secured to opposite ends of the front ways 21, and the space between each gage block and the adjacent housing is adapted to receive any one of several detachable gage bars 30 of various lengths, one being shown in Fig. 10, thus facilitating the proper spacing of the housings to suit the length of work pieces W, such as shafts, which travel in a circular path between the housings, as hereinafter described.

At one end of the base frame is secured an upstanding gear casing 31. A horizontal mandrel or arbor 32 is journalled in the gear casing 31 and in each of the housings 23 and 24, and extends above and in parallel relation to the ways 21 and 22, and in a vertical plane about midway between the ways. One end of the mandrel is keyed to a worm wheel 33 enclosed in the casing 31, the worm wheel rotating the mandrel at a suitable low speed. The worm wheel is driven in any suitable manner, as by a train of gearing, designated generally by 34, and including a horizontal pulley shaft 35 journalled in the base frame, the pulley shaft having a pulley 36 driven through V-belts 37 by an electric motor 38 adjustably mounted on top of the gear casing 31. The belt drive is enclosed by a suitable guard 39.

Each housing carries longitudinally adjustable spindles 40 and 41 for a roughing milling cutter 42 and a finishing milling cutter 43, respectively. These spindles have their bearings in the housing and their axes are parallel to the mandrel axis and extend below the horizontal plane of the mandrel axis.

A splined cutter drive shaft 44 is journalled in the base frame in parallel relation to the ways and is driven in any suitable manner, as by the pulley shaft 35 through suitable gearing 45. A pair of gears 46 are splined on the drive shaft 44, one being carried by each housing. In each instance, the gear 46 meshes with a gear 47 on a shaft carrying a gear 48, which meshes with gears 49 and 50 on the cutter spindles 40 and 41, respectively, the several gears being mounted in each housing.

The construction of the cutter spindles and their drives is generally similar to that shown in Davis Patent 1,545,744 for Milling Machine, issued July 14, 1925.

The housings 23 and 24 have respective bearing caps 51 and 52 secured by bolts 51' and provided with drill-controlling cam means, hereinafter described. Drilling carriages 53 and 54, hereinafter more fully described, are associated with the respective housings 23 and 24, and are swingably mounted on the mandrel 32. The carriages 53 and 54 are of similar construction except that some of the parts are of opposite hand. Each carriage has a reciprocable drill spindle 55 extending parallel of the axis of the mandrel 32 and actuated as hereinafter described, the spindle carrying a centering drill 55'.

A work-holding fixture 56 is keyed to the mandrel between the housings 23 and 24, and is here shown to comprise two pairs of armed plates or spiders 57 with split hubs 58 clamped about the mandrel by bolts 59. Undercut channel-shaped vise bodies 60 are bolted between each pair of plates 57 and fit in grooves 61 formed in the plates. A pair of work-clamping jaws 62 are guided in each vise body and are actuated by a screw shaft 63 with right-hand and left-hand threads. The screw shaft is journalled at opposite ends of the vise body and is suitably confined against axial movement, as by a flange 64 on the screw shaft. Each screw shaft has a squared wrench-receiving outer end 65. The work pieces are loaded onto and removed from the fixture at the front of the machine, and each workpiece is longitudinally positioned by a vertical abutment plate 66 carried on an arm 67 adjustably secured to the housing cap 51. The fixture is adapted to clamp work pieces of different diameter, the centers of which will remain at a fixed radius from the mandrel axis.

Each of the drilling carriages 53 and 54 comprises an angle-shaped casting 68 bolted to a vertical plate 69 to form a loop-shaped frame which is straddled over the cap member 51 of the housing, each leg of the frame having a bearing portion through which the mandrel extends. The spaced legs of the carriage lie close to the opposite parallel end walls of the housing to prevent axial shifting of the carriage. The drill spindle 55 is journalled in a quill 70 slidable in the carriage and prevented from rotation by a key member 71. The rear end of the spindle is splined in the hub of a pulley 72 rotatably carried by a bracket 73 secured to the carriage plate 69. The pulley 72 is connected by V-belts 74 to a pulley 75 of an electric motor 76 adjustably mounted on the carriage. If desired, the belt drive may be enclosed by a guard 76'. The quill 70 mounts a split collar 77 which is keyed thereto and longitudinally adjustable thereon and carries a roller 78 at its lower side, the axis of the roller being substantially radial with respect to the mandrel 32. The collar 77 and its attached roller 78 are movable in a hollow part of the casting 68. A pair of spring-guiding rods 79 and 80 extending from opposite ends of the collar 77 in parallel relation to the quill, and guide thereon a pair of compressed coiled springs 81 and 82, respectively, which extend into a bore 83 formed in the carriage. The springs are placed under adjustable compression by screw-threaded rods 84 and 85, respectively.

The bearing cap 51 is provided with an inclined cross channel 86 flanked by similarly inclined platforms 87. An upstanding cam block 88 is secured in the channel 86 by screws 89, and is provided with front cam surfaces 90 and 91 and a rear cam surface 92 adapted to be engaged by the roller 78 on the forward and return strokes of the drill carriage. Auxiliary front and rear cam members 93 and 94 are secured to the bearing cap and have respective cam surfaces 95 and 96 spaced from opposite ends of the cam block. Brackets 97 are secured to the platforms 87 at each side of the cam block and receive plungers 98 which are urged rearwardly by springs 99, Fig. 7, the rearward travel of the plungers being limited by nuts 100 on the plunger. The rounded rear ends of the plungers 98 are engageable with rounded portions of blocks 101 secured to the swingable drilling carriage, these blocks engaging the plungers when the carriage is at the front end of its travel, as shown in Fig. 7. The purpose of the spring plungers is to start the carriage rearwardly on its return stroke.

A cam block 102 is bolted to the front portion of the bearing cap 51 and has a cam surface 103. A driving follower plunger 104 is slidably mounted in the front portion of the carriage and in a bushing 105 secured to the carriage in parallel relation to the mandrel and has a cam roller 106 adapted to engage the cam surface 103.

The plunger 104 is urged forwardly by a coiled spring 107 bearing against an annular flange 108 which is engageable with the bushing 105 to limit the forward movement of the plunger. The front end of the driving plunger 104 is engageable in succession by six equally spaced driving or abutment blocks 109 seated in tangentially extending recesses 110 formed in the adjacent fixture plate 57, each block having an abutment shoulder 111. Each driving block is longitudinally adjustable in its recess and is locked in position by screws 112 and by a wedge block 113, the latter being secured by a screw 114, Figs. 16 and 17.

The rearward swinging travel of the drilling carriage is suitably cushioned, as by an adjustably valved air cylinder 115, Fig. 2, trunnioned at 116 on a yoked bracket 117 secured to the rear portion of the housing 23. If desired, the drilling carriage may also be provided with a counterweight arm 118 to assist the initial rearward travel of the carriage.

In operation, the mandrel 32 rotates continuously, and the fixture 56 moves the work pieces in a circular orbit, the work pieces being loaded and unloaded at the front of the machine. The opposite ends of each work piece move past the roughing and finishing milling cutters 42 and 43, and at the rear of the machine the work pieces rise toward the drilling spindles. When retracted, each swingable drilling carriage is in the inclined position seen in Fig. 2, in which it is stopped either by the cushioning air cylinder 115 or by the shiftable carriage plunger 104 engaging the nearby rising driving block 109 on the work fixture. The drilling carriage is then swung forwardly synchronously with the continuously rotating fixture, and during the carriage travel the roller 78 on the drilling spindle quill rolls along the cam surfaces 90 and 91, advancing the drill into the end of the work piece to form a centering hole. When the drilling carriage approaches its vertical position the roller 78 leaves the front end of the cam block 88 under urge of the spring 81, thus retracting the drill from the end of the work piece. Simultaneously, the roller 106 on the driving plunger rolls along the cam surface 103 of the cam block 102 to retract the plunger from the fixture shoulder 11, and shortly after the drill leaves the work piece, the plunger is completely withdrawn from the shoulder. At this point the return springs 99 have been compressed by the drill carriage blocks 101, causing the carriage to be urged rearwardly. The rearward travel of the carriage is assisted by the counterweight arm 118 and is restrained by the air cylinder 115. During the rearward travel of the carriage the roller 78 of the drill spindle quill rolls along the rear cam surface 92 of the cam block 88, and when the carriage approaches its rear position the roller 78 leaves the cam block and is moved forwardly by the spring 82 in readiness to ride on the front cam surfaces of the cam block. If for any reason the springs 81 and 82 should fail to move the drill quill at the ends of the drill carriage travel, the auxiliary cam members 93 and 94 will displace the quill roller 78.

The compression of the coiled springs 81 and 82 is so adjusted that when the cam roller 78 leaves the opposite ends of the cam block 88, this roller will be approximately in the vertical middle plane of the cam block.

What I claim as new and desire to secure by Letters Patent is:

1. In a machine tool, a continuously rotatable work carrier having a circular series of work stations, an oscillatory carriage swingable about the axis of said carrier, a tool spindle on said carriage, a plurality of driving abutments rotatable with said carrier, there being an abutment for each work station and said abutments being individually adjustable on the carrier, a shiftable member on said carriage successively engageable by said abutments for moving said carriage synchronously with said carrier, means including a stationary cam for advancing the tool spindle to the work during the synchronous movement of the carrier and carriage, and means including a stationary cam for retracting said shiftable member out of the path of said driving abutments to terminate the advancing travel of the carriage.

2. In a machine tool, a housing, a continuously rotatable work carrier supported by said housing, an oscillatory tool carriage swingable about the axis of the carrier, driving means for swinging said carriage on an advancing stroke synchronously with the travel of said carrier, and cam means including a stationary cam on said housing for controlling the oscillating travel of said carriage.

3. In a machine tool having a housing and further having a continuously rotatable carrier for moving work pieces in a circular orbit, an oscillatory carriage swingable about the axis of said carrier on forward and return strokes, releasable driving means for synchronously moving said carriage with the carrier, a drill axially movable on said carriage in parallel relation to the carrier axis, stationary cam means on said housing for advancing and retracting said drill with respect to the work during the forward stroke of said carriage, and means including a stationary cam on said housing for releasing the driving connection for said carriage at the end of the forward stroke of said carriage.

4. In a machine tool, a continuously rotatable work carrier, an oscillatory tool carriage swingable about the axis of said carrier on forward and return strokes, driving means for moving said carriage on its forward stroke synchronously with the work carrier, a rotary tool on said carriage, a reciprocable support for said tool having a projection, a stationary cam having a tool-actuating cam face and a tool-retracting cam face at opposite sides, said tool-actuating cam face being engageable by said projection during the forward stroke of said carriage and said tool-retracting cam face being engageable by said projection during the return stroke of said carriage, said projection having a loop-shaped path around said cam during the reciprocation of said carriage, and spring means for moving said projection to an intermediate position at each end of the travel of said carriage.

5. In a machine tool, a continuously rotatable work carrier, an oscillator tool carriage swingable about the axis of said carrier on forward and return strokes, driving means for moving said carriage on its forward stroke synchronously with the work carrier, a rotary tool on said carriage, a reciprocable support for said tool having a projection, a stationary cam having a tool-actuating cam face and a tool-retracting cam face at opposite sides, said tool-actuating cam face being engageable by said projection during the forward stroke of said carriage and said tool-retracting cam face being engageable by said projection during the return stroke of said carriage, said projection having a loop-shaped path around said cam during the reciprocation of said carriage, and cam means for moving said projection to an intermediate position at each end of the travel of said carriage.

6. In a machine tool, an oscillating swingably mounted tool carriage movable on forward and return strokes, a work carrier movable with said carriage during the forward stroke of said carriage, a tool-holding quill slidable in said carriage, a roller on said quill, a stationary cam on which said roller rides for advancing and retracting said quill, said cam having a quill-advancing cam face and a quill-retracting cam face, and means for driving said carriage on its forward stroke synchronously with said carrier.

7. In a machine tool, a continuously rotatable carrier adapted to hold a succession of work pieces, a stationary housing rotatably supporting said carrier, an oscillatory carriage swingable about the axis of said carrier on forward and return strokes, a rotatable drill spindle on said carriage for successively operating on said work pieces, driving means for moving said carriage on its forward stroke synchronously with said carrier, and feeding means for said drill spindle operable during the forward stroke of said carriage, said feeding means including a stationary cam carried by said housing.

8. In a machine tool, a housing having an arbor bearing with a bearing cap, a continuously rotatable work carrier including an arbor journalled in said bearing, an oscillatory tool carriage swingable about the axis of the carrier and having a reciprocable tool support, driving means for swinging said carriage on an advancing stroke synchronously with the travel of said carrier, and means including stationary cams on said bearing cap for controlling the oscillating travel of said carriage and the reciprocation of said tool support.

9. In a machine tool, a housing, a generally horizontal mandrel rotatable in said housing, a continuously rotatable work carrier on said mandrel for moving the work in a circular orbit, an oscillatory carriage swingable about the axis of said carrier on forward and return strokes, tool means on said carriage, said carriage rising on its forward stroke and being urged by gravity on its return stroke, a shiftable follower on said carriage, a driving abutment on said work carrier engageable with said follower to lift said carriage on its forward stroke, and stationary cam means on said housing engageable by the follower near the end of the forward stroke of said carriage for moving said follower out of driving engagement with said abutment at the end of the forward stroke of said carriage to permit lowering of said carriage on its return stroke.

References Cited in the file of this patent
UNITED STATES PATENTS

| | | |
|---|---|---|
| 1,094,601 | Schellenbach | Apr. 28, 1914 |
| 1,376,861 | Davis | May 3, 1921 |
| 1,510,811 | Ward | Oct. 7, 1924 |
| 1,823,670 | Thacher | Sept. 15, 1931 |
| 1,830,659 | Jacobson | Nov. 3, 1931 |
| 1,954,920 | Damerell | Apr. 17, 1934 |
| 2,053,748 | Spring | Sept. 8, 1936 |
| 2,118,024 | Potter | May 17, 1938 |
| 2,165,774 | White | July 11, 1939 |
| 2,364,884 | Weimer | Dec. 12, 1944 |
| 2,545,344 | Crawford | Mar. 13, 1951 |
| 2,577,517 | Gallimore | Dec. 4, 1951 |
| 2,619,707 | Young et al. | Dec. 2, 1952 |